April 25, 1944.  P. F. SPERRY ET AL  2,347,520

CAMERA ATTACHMENT

Filed Nov. 24, 1941  3 Sheets-Sheet 1

Inventors:
Philmore F. Sperry
Philip F. Briskin
Jack Briskin
By: Isabel Carlson Fitzhugh &Wells
Attys.

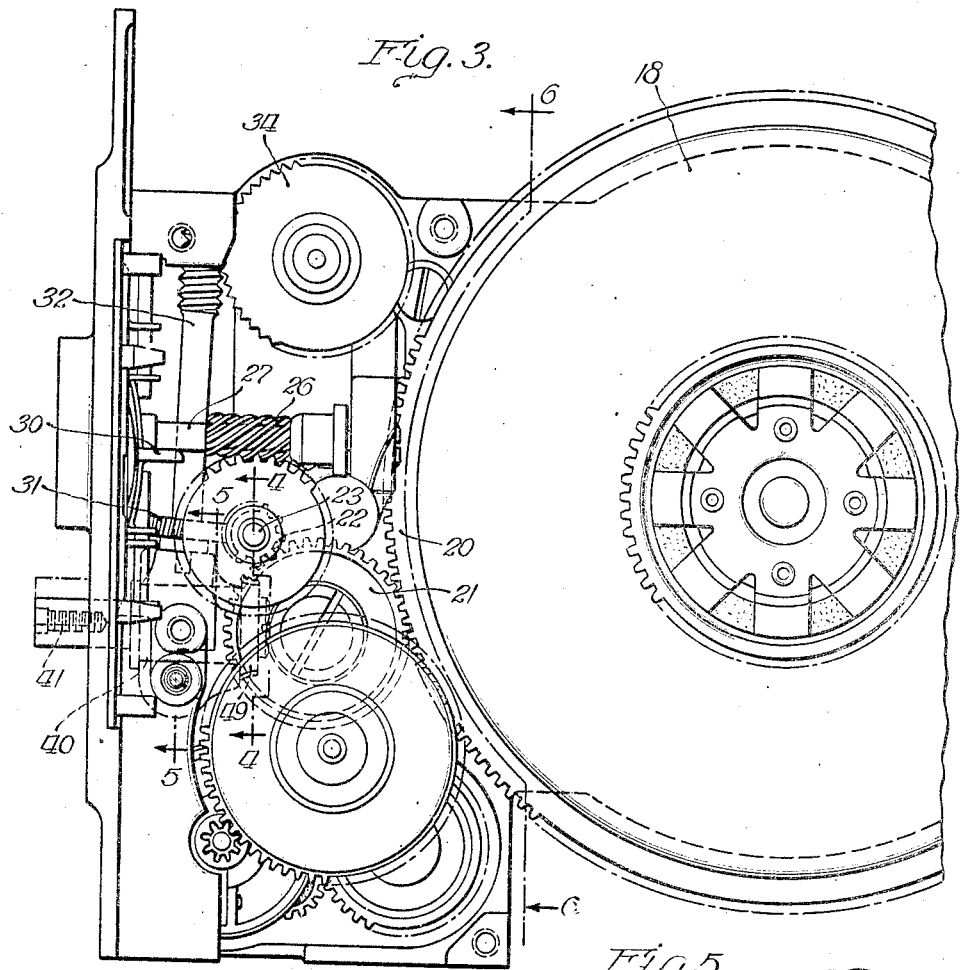
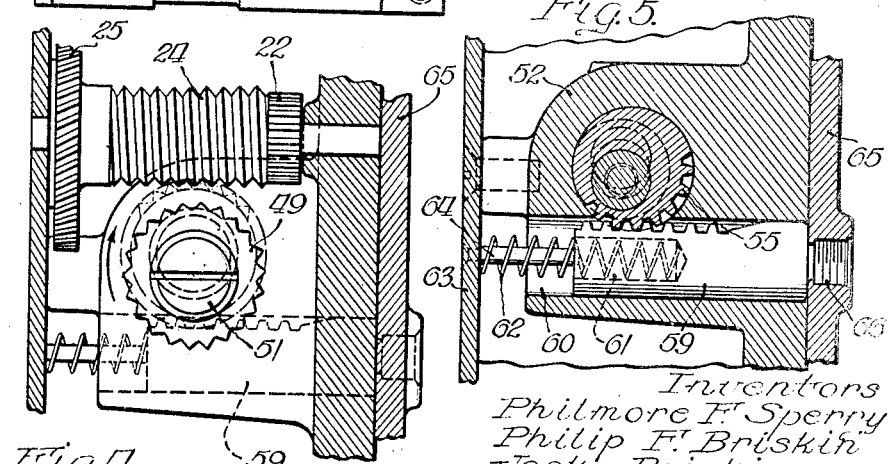

April 25, 1944.  P. F. SPERRY ET AL  2,347,520
CAMERA ATTACHMENT
Filed Nov. 24, 1941  3 Sheets-Sheet 3
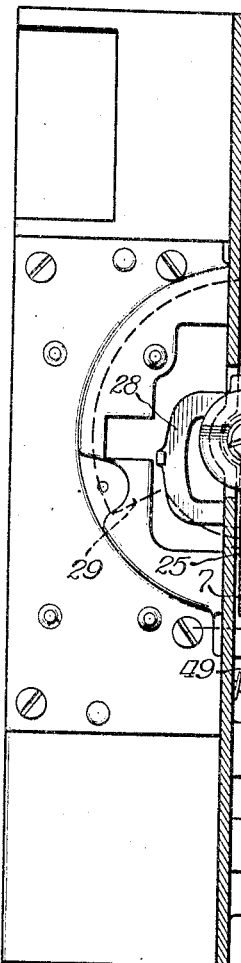
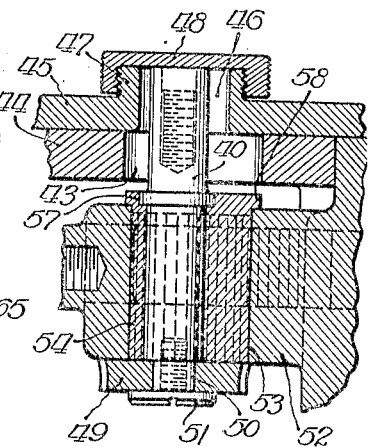
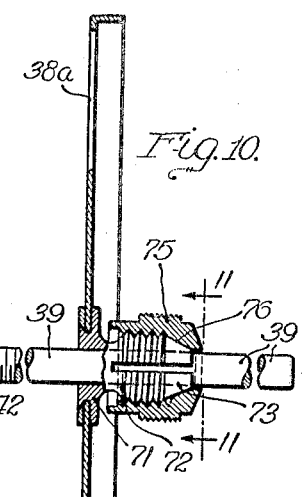
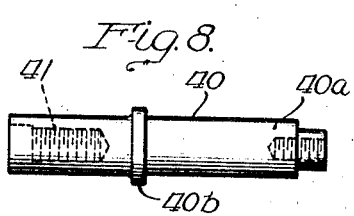
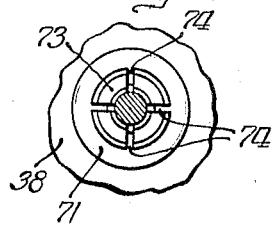
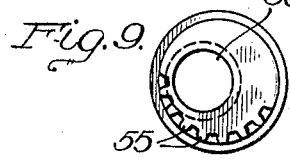
Inventors:
Philmore F. Sperry
Philip F. Briskin
Jack Briskin Patented Apr. 25, 1944

2,347,520

UNITED STATES PATENT OFFICE 2,347,520

CAMERA ATTACHMENT

Philmore F. Sperry, Philip F. Briskin, and Jack Briskin, Chicago, Ill.; Helen B. Sperry, executrix of said Sperry, deceased, assignor, by mesne assignments, to Theodore H. Briskin, Philip F. Briskin, and Jack Briskin Application November 24, 1941, Serial No. 420,222

5 Claims. (Cl. 74—405)

The present invention relates to a camera attachment adapted to produce a simulation of fade-in or fade-out at the beginning or end of a certain series of pictures. The attachment is of such nature that it is readily operable from the camera drive mechanism at the will of the operator. The nature of the attachment is such also that it does not interfere with the regular operation of the camera, and the exposed portions of the attachment may readily be removed from the camera or placed thereon at any time.

A preferred form of the invention is embodied in a motion picture camera having the usual lens and having a film driving mechanism and a shutter driving mechanism therein whereby portions of the film in the camera may be successively exposed through the lens in the well known manner. The present attachment comprises a movably mounted shaft support within the camera, a shaft, and means on the shaft adapted to operably connect the shaft to a drive element of the camera thereby to effect rotation of the shaft. The shaft projects through the front wall of the camera in position to receive a removable fade-out disc which when mounted on the shaft extends in front of the lens opening of the camera in position to block the field of view through the lens. The disc itself may be provided with any suitable means for gradually blocking out the field of view of the lens as the shaft is rotated. A manually operable device is connected with the movable shaft support so as to move the support to bring the shaft driving member into and out of engagement with the driving element of the camera mechanism.

Specifically it is an object of the present invention to provide a novel attachment of the character described whereby a simple finger movement by the operator serves to set the fade-out mechanism into operation.

It is also an object of the present invention to provide a novel means for connecting the attachment shaft to a driving element of the camera mechanism, with the parts so arranged as to make their assembly possible within the space available for the parts while at the same time being arranged so as to provide for smooth and easy operation.

The features and advantages of the present invention will appear more fully as the description proceeds, reference being had to the accompanying drawings wherein a preferred form of the invention is shown. It should be understood however that the drawings and description are illustrative only and are not to be considered as limiting the invention except insofar as it is limited by the claims.

In the drawings:

Fig. 3 is an enlarged fragmentary view in side elevation looking at the camera from the side opposite that shown in Fig. 2 with the cover plate removed;

Fig. 4 is an enlarged fragmentary sectional view taken on the line 4—4 of Fig. 3;

Fig. 5 is a fragmentary sectional view taken on the line 5—5 of Fig. 3;

Fig. 6 is a sectional view taken on the line 6—6 of Fig. 3;

Fig. 7 is a fragmentary sectional view taken on the line 7—7 of Fig. 6;

Fig. 8 is a detailed view of the movably supported shaft in the camera;

Fig. 9 is a detailed end view of the movable shaft support;

Fig. 10 is a vertical section through the fade-out disc and its supporting shaft; and Fig. 11 is a fragmentary sectional view taken substantially on the line 11—11 of Fig. 10, the cap screw being removed.

Figure 1:
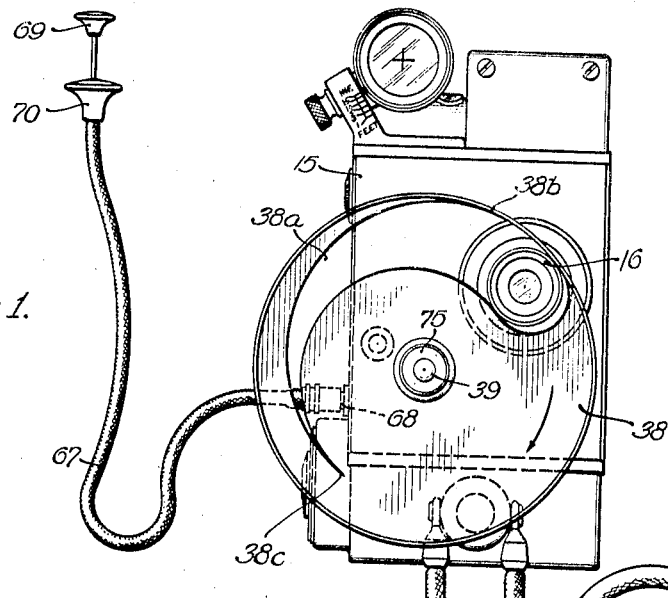
Fig. 1 is a front view of a camera embodying the present invention.

Referring now in detail to the drawings, the camera shown in Fig. 1 comprises a casing 15 on the front of which there is mounted a lens 16 and on the top of which there is mounted a view finder 17. The camera as shown has a spring mechanism indicated generally by the numeral 18 (see Fig. 3), which spring mechanism is housed in a part 19 of the casing. The spring mechanism is of such nature as to communicate movement to a gear 20 (see Fig. 3), which gear in turn drives a gear 21 that meshes with a pinion 22 fixed on a shaft 23. The shaft 23 also has fixed thereon a worm 24 and a gear 25. The gear 25 in turn meshes with a spiral gear 26 which is fixed on a shaft 27, the shaft 27 being operably connected to a film shuttle 28 and a shutter 29. The shuttle 28 has a film driving finger 30.

Figure 2:
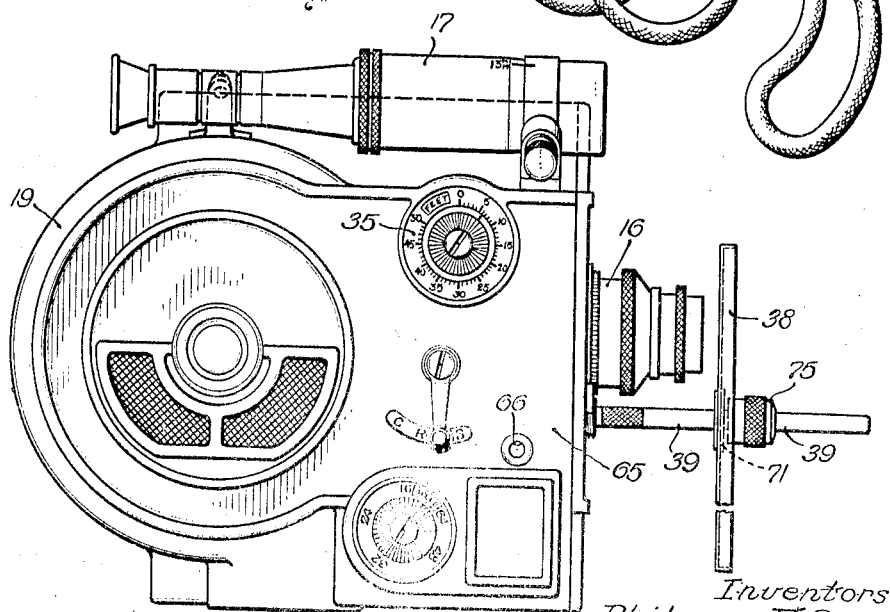
Fig. 2 is a view in side elevation of the camera.

The worm 24 also drives a worm gear 31 to rotate a shaft 32. The shaft 32 has a worm 33 thereon meshing with the worm gear 34 which is part of a footage indicator indicated at 35 in Fig. 2.

The gear 21 meshes with a pinion 36 which serves to drive a governor mechanism for the camera indicated generally by the numeral 37. This governor mechanism forms no part of the present invention and will not be further described.

The present invention is embodied in a fade-out attachment which comprises a disc 38 which is adjustably mounted on a shaft 39 and is adapted to screw into a movably mounted stub shaft 40 (see Figs. 7 and 8). The stub shaft 40 as shown has a screw threaded socket 41 in one end thereof for receiving a screw threaded end 42 on the shaft 39. The shaft 40 is movably supported within the camera casing and projects forwardly to the front of the camera casing through an aperture 43 in a casting 44 which is a part of the camera frame. The shaft 40 also extends through a front plate 45 which covers a portion of the front of the camera. This front plate has an aperture 46 and a screw threaded boss 47 projecting forwardly around the aperture 46. Normally the aperture 46 is closed by a cap 48 that is threaded onto the boss 47. It will be noted from an inspection of Fig. 7 that the apertures 43 and 46 are sufficiently large to permit a substantial movement of the shaft 40 in a direction perpendicular to its axis. The aperture 43 is also large enough to permit insertion through it of a shaft supporting member 54 which must pass through the casting 44 in the assembly of the machine.

Means are provided whereby the shaft 40 may be moved in the direction perpendicular to its axis toward and away from the worm 24 which is a part of the driving mechanism of the camera. The shaft 40 has a worm gear 49 mounted upon the reduced end 50 thereof and held in place by a screw 51. A supporting block 52 forming a part of the camera frame is provided with a bore 53 that rotatably receives a toothed member 54. The member 54 as shown best in Figs. 5, 7 and 9 has a series of gear teeth 55 formed in the periphery thereof and has an eccentrically located cylindrical aperture 56 therein. The aperture 56 is adapted to receive one end 40a of the shaft 40. An enlarged portion 40b on the shaft 40 fits in a recess 57 which is formed in one end of the member 54 around the aperture 56. The member 54 has an annular flange 58 at the same end as the recess 57, this annular flange being adapted to engage the adjacent surface of the block 52 to limit the movement of the member 54 into the opening 53. It will be evident that by rotation of the member 54 the shaft 40 and its worm gear 49 will be moved about the axis of the member 54. In one position the shaft 40 and the worm gear 49 are moved upwardly so that the worm gear 49 engages the worm 24 of the drive mechanism of the camera. This position is shown in dotted lines in Fig. 4 of the drawings. The worm gear 49 in Fig. 4 is shown in full lines in its lowermost position.

In order to move the worm gear 49 into and out of driving engagement with the worm 24 I provide a rack 59 which is slidably mounted in an aperture 60 in the block 52. The rack 59 has a recess 61 in one end thereof to receive a spring 62 that is under compression between the rack 59 and a frame plate 63 of the camera. A pin 64 is fixed on the frame plate and extends toward the rack 59 to serve as a guide for the spring 62. The rack 59 abuts a side plate 65 of the camera and the side plate is provided with a screw threaded aperture 66 which opens on the end of the rack 59. In order to push the rack inwardly against the pressure of the spring 62 any suitable push rod may of course be shoved into the opening 66 to engage the rack. I prefer to provide a Bowden wire construction 67 illustrated in Fig. 1 for the purpose of actuating the rack 59. This Bowden construction has a head portion 68 threaded into the aperture 66. At its outer end the Bowden wire has a push button 69 and a finger piece 70. By pressing in on the push button 69 and holding the finger piece 70 the operator can apply pressure to the rack 59 by means of the inner plunger on the Bowden wire construction so as to cause the rack to turn the member 54 and bring the worm gear 49 up into engagement with the worm 24. When this is done the worm 24, if it is rotating, will drive the gear 49 at a relatively low rate of speed, thus effecting a slow turning of the shaft 40. The turning movement of the shaft 40 will also rotate the removable shaft extension 39 to cause the fade-out disc 38 to move in front of the lens 16.

As shown in the drawings, the fade-out disc 38 is provided with an aperture 38a which gradually decreases in cross section from a point 38b to a point 38c approximately diametrically opposite the point 38b. The aperture 38a is formed about the axis of the disc 38, its center line intersecting the lens axis so that as the disc is rotated the effect is gradually to reduce the exposure field for the lens to zero. It will be understood that any other desired construction may be given to the fade-out disc 38 within the scope of the present invention.

The disc 38 is adapted to be adjustably mounted on the shaft 39 so that it may be set at the desired distance from the lens 16 or removed entirely from the shaft 39 and reversed thereon. For this purpose the disc 38 has a hub 71 that includes a lateral extension 72 which is exteriorly screw threaded and which is provided with a cone-shaped tip 73. The extension 72 is also slit longitudinally by a series of slots 74 so that it may be compressed by threading a cap screw 75 thereon. The cap screw 75 has a cone-shaped portion 76 which is adapted to engage the cone-shaped tip 73 of the extension 72 to compress the tip and thus clamp the extension 72 to the shaft 39.

From the foregoing description it is believed that the construction and the operation of the camera attachment will be readily apparent to those skilled in this art. The operator of the camera may remove the shaft 39 and the disc 38 from the camera at any time and apply the cap 48 to cover the aperture 46. Similarly the Bowden wire device 67 can be removed. The aperture 66 for receiving this device needs no cap because the rack 59 closes the aperture and maintains it closed under the pressure of the spring 62. Whenever it is desired to use the fade-out disc 38 the operator of the camera may do so by mounting the shaft 39 in the shaft 40 and then using the Bowden wire device 67 to connect the attachment to the driving mechanism of the camera at the desired moment and for the desired time. Release of the button 69 will result in disconnecting the attachment from the driving mechanism at the end of any fade-out operation. After that the operator can reset the disc 38 on the shaft 39 so as to position the point 38b opposite the lens and leave the attachment in this position until such time as he desires to use it again; for example, at the end of the next sequence where he desires to use a fade-out ending.

Having thus described our invention, what we claim as new and desire to secure by Letters Patent is:

1. Means for removably supporting a fade-out device on a camera and for driving it from the operating mechanism of the camera, comprising in combination a rotatably mounted eccentric, a shaft rotatably mounted in said eccentric, driving means on said shaft operatively connected with a cooperating driving mechanism for rotating the shaft in one position of said eccentric and located out of operative engagement with said cooperating driving mechanism when the eccentric is rotated to a different position, manually movable means adapted by an operative stroke to rotate said eccentric into the position in which said driving means is operative for rotating said shaft, and yielding means normally opposing the operative stroke of said manually movable means and adapted when the manually movable means is release after an operative stroke to return the parts to their normal positions.

2. Means for removably supporting a fade-out device on a camera and for driving it from the operating mechanism of the camera, comprising in combination a rotatably mounted eccentric, a shaft rotatably mounted in said eccentric, driving means on said shaft operatively connected with a cooperating driving mechanism for rotating the shaft in one position of said eccentric and located out of operative engagement with said cooperating driving mechanism when the eccentric is rotated to a different position, rack and pinion mechanism adapted by an operative stroke of the rack longitudinally to rotate said eccentric into the position in which said driving means is operative, and a spring normally opposing the longitudinal movement of the rack and adapted when the rack is released after an operative stroke to return the parts to their normal positions.

3. Means for removably supporting a fade-out device on a camera and for driving it from the operating mechanism of the camera, comprising in combination a rotatable cylindrical member, a shaft rotatably mounted in said cylindrical member longitudinally thereof in eccentric position therein a worm, a worm gear fixedly mounted on said shaft in position for engagement with said worm when said cylindrical member is given an operative movement in one direction so as to cause said shaft to rotate and adapted when the cylindrical member is given a reverse movement to move out of engagement with said worm, and manually movable means adapted by an operative stroke to rotate said cylindrical member into position for the engagement of said worm gear with said worm.

4. Means for removably supporting a fade-out device on a camera and for driving it from the operating mechanism of the camera, comprising in combination a rotatable cylindrical member, a shaft rotatably mounted in said cylindrical member longitudinally thereof in eccentric position therein a worm, a worm gear fixedly mounted on said shaft in position for engagement with said worm when said cylindrical member is given an operative movement in one direction so as to cause said shaft to rotate and adapted when the cylindrical member is given a reverse movement to move out of engagement with said worm, a pinion fixedly mounted on said cylindrical member, a rack bar slidably mounted in position with its teeth engaging said pinion so as to cause the cylindrical member to rotate upon an operative movement of the rack bar longitudinally, and yielding means normally opposing the operative movement of the rack bar adapted when the rack bar is released after an operative stroke to return the parts to their normal positions.

5. Means for removably supporting a fade-out device on a camera and for driving it from the operating mechanism of the camera, comprising in combination a rotatable cylindrical member, a shaft rotatably mounted in said cylindrical member longitudinally thereof in eccentric position therein a worm, a worm gear fixedly mounted on said shaft in position for engagement with said worm when said cylindrical member is given an operative movement in one direction so as to cause said shaft to rotate and adapted when the cylindrical member is given a reverse movement to move out of engagement with said worm, a pinion fixedly mounted on said cylindrical member, a rack bar slidably mounted in position with its teeth engaging said pinion so as to cause the cylindrical member to rotate upon an operative movement of the rack bar longitudinally, yielding means normally opposing the operative movement of the rack bar adapted when the rack bar is released after an operative stroke to return the parts to their normal positions, and means for releasably connecting a Bowden-wire operating device in position opposite to the end of said rack bar for giving the rack bar an operative longitudinal movement.

PHILMORE F. SPERRY.
PHILIP F. BRISKIN.
JACK BRISKIN.